United States Patent [19]

Hardigg et al.

[11] 4,276,360
[45] Jun. 30, 1981

[54] BATTERY JAR COVER AND WELDING METHOD THEREFOR

[75] Inventors: James S. Hardigg; Joseph C. Strzegowski, Jr., both of Conway, Mass.

[73] Assignee: Hardigg Industries, Inc., South Deerfield, Mass.

[21] Appl. No.: 87,149

[22] Filed: Oct. 22, 1979

[51] Int. Cl.³ .............................................. H01M 2/08
[52] U.S. Cl. ........................................ 429/175; 429/82
[58] Field of Search ............... 429/175, 176, 122, 163, 429/82, 177

[56] References Cited

U.S. PATENT DOCUMENTS

| | | | |
|---|---|---|---|
| 576,720 | 2/1897 | Brewer | 429/164 |
| 576,936 | 2/1897 | Badt | 429/163 X |
| 1,364,469 | 1/1921 | Woodbridge | 429/175 |
| 1,371,895 | 3/1921 | Holland | 429/175 |
| 1,618,528 | 2/1927 | Grill | 429/175 |
| 1,673,677 | 6/1928 | Holland | 429/175 |
| 1,860,663 | 5/1932 | Dunzweiler et al. | 429/175 X |
| 2,603,671 | 7/1952 | Burns et al. | 429/163 X |
| 3,449,170 | 6/1969 | Thornblod et al. | 429/163 X |
| 3,627,586 | 12/1971 | Jammet | 429/170 |
| 4,009,322 | 2/1977 | Wolf | 429/175 |

*Primary Examiner*—Charles F. Lefevour
*Attorney, Agent, or Firm*—Cushman, Darby & Cushman

[57] ABSTRACT

A battery jar cover designed to be welded onto a battery jar. The cover is provided with an alignment device spaced inwardly away from the outer edges of the cover around the periphery with predetermined portions contacting and engaging the interior wall surface of the battery jar forming a gap or space.

25 Claims, 16 Drawing Figures

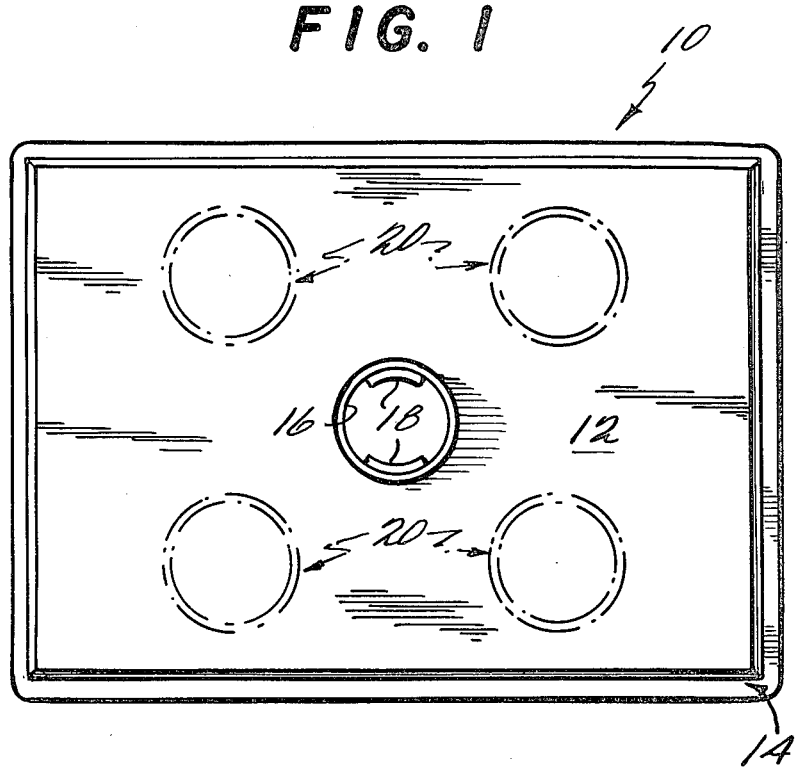
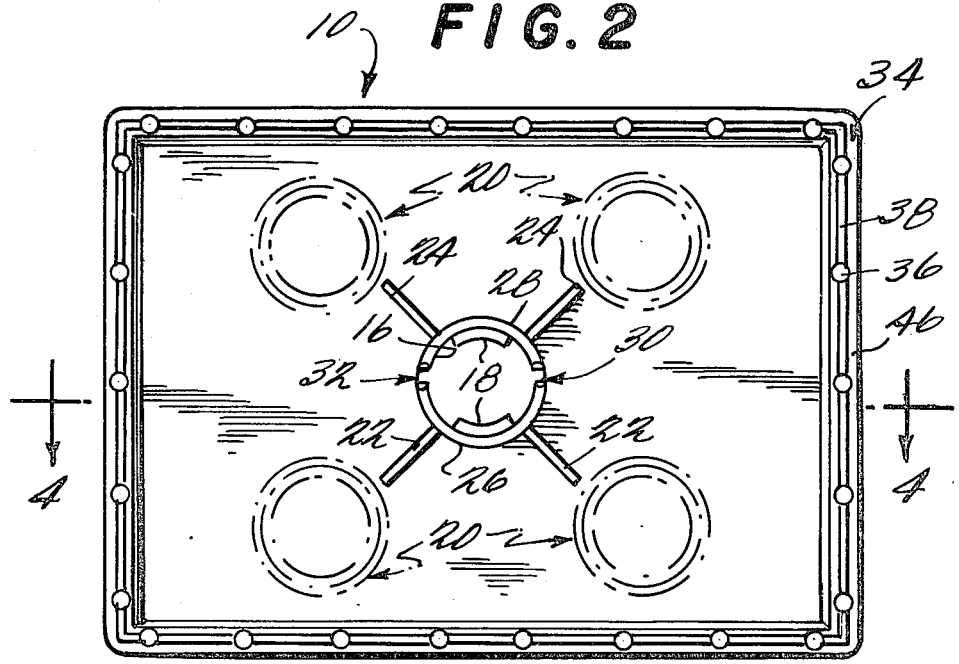

BATTERY JAR COVER AND WELDING METHOD THEREFOR

BACKGROUND OF THE PRESENT INVENTION

This invention relates to a unique battery jar cover which has been designed to be welded onto a battery jar by means of automatic heat sealing equipment. Specifically, this invention concerns the manufacturing of a composite structure which comprises a storage battery which includes an outer jar or container of suitable non-current conducting and acid resisting material in which conventional battery elements and terminal posts have been previously placed which is closed by the cover described herein. Further, the welding of this cover to battery jars can be accomplished in a more efficient and effective manner by improved processing techniques made possible by this cover structure.

It is, of course, desirable when preparing this composite battery structure that the cover be effectively sealed around its periphery to the top of the battery jar so that notwithstanding in service conditions, including both high and low temperatures, vibrations, or other work environment conditions, that the seal between the cover and the rim of the battery jar remain intact. Thus, what is desired is a seal that is a substantially permanent, hermetic seal that is acid proof and that can resist at least the above service conditions, while at the same time providing strength at the joint.

Is also desirable, to the extent possible, to automate the process of welding battery jar covers onto battery jars. One difficulty in this regard, is created by the fact that the battery jars have electrodes in place so that their terminal posts extend upwardly beyond the plane established by the upper rim of the battery. Thus, in the past, it has been necessary to manually place covers on battery jars followed by the manual application, of some type of sealing composition or joint compound to fill and the joint area between the cover and the battery jar's upper rim. Examples of such joints can be found in Dusenburg U.S. Pat. No. 557,779 and Badt U.S. Pat. No. 576,936.

Alternatively, and more recently, the joint between battery covers and battery jars has involved an open upwardly directed groove between the upper surface of the cover and the rim area of the jar that would allow the insertion of thermosetting material between the cover and the battery jar. The thermosetting material could be a resin or cement compound which would thereafter be cured or permanently set without pressure or accelerators when baked for a relatively long period at about 200° F. Burns et al U.S. Pat. No. 2,603,671 is exemplary of this latter technique.

Still more recently, battery covers have been glued or sealed onto battery jars by means of epoxy adhesives or by ultrasonic welding. In many cases the ultrasonic process is not capable of producing a hermetically sealed container at the point of the weld especially where there are thick or complicated tongue and groove type joints since such structures are believed difficult to penetrate with the ultrasonic waves. Thus, acid leaks can occur at points along the weld or from poorly secured areas where the thickness to be penetrated was too great to provide a completely solid weld. Ultrasonic welding requires the material be relatively stiff and works best where the ultrasonic electrodes can be on opposite sides of the work piece. Accordingly use along corner structures, as would be required when welding battery covers onto battery jars, provides a difficult set of conditions which would have to be overcome in order to produce a good weld. Likewise, glueing procedures do not always result in a continuous hermetically sealed joint around the entire structure and in some cases requires the cover to be turned upside down so that glue can be placed in a groove into which the battery jar rim is ultimately placed after the whole jar has been inverted. Since the lid element is within the battery jar at this point and it may weigh many pounds, it is a difficult process to turn the entire jar assembly upside down in order to correctly position it on the top. Exemplary patents are Thornblad et al U.S. Pat. No. 3,449,170 and Jammet U.S. Pat. No. 3,627,586.

There have been a relatively wide variety of cover shapes. Some have mitered joints such as in Jammet, U.S. Pat. No. 3,627,586, or tongue and groove joints as in Burns et al U.S. Pat. No. 2,603,671 while in others grooves have been provided either in the cover itself as in Thornblad et al U.S. Pat. No. 3,449,170 or in the upper rim of the jar as in Dusenburg U.S. Pat. No. 557,779 or Badt U.S. Pat. No. 576,936.

In addition, covers are known in the art that have a raised, flat rim area extending away from the bottom side of the cover and extending around the periphery thereof. The width of the raised area is as wide as the thickness of the side wall of the battery jar so that the two surfaces define between them a horizontal welding surface.

Covers are also known that employ a continuous flange which depends from the bottom surface of the cover with the flange being recessed inwardly from the edge just so as to define a horizontal bonding surface from the flange to the edge along the bottom of the cover. In this arrangement there is relatively tight engagement between the outer surface of the flange and the inner wall of the battery jar. In some cases, these tops have been glued with epoxy adhesive to the battery jar and in other cases the covers have been held, manually, in a slightly raised condition and a thermosetting or other sealing material is inserted within the opening provided between the cover and the rim of the battery jar and that material is thereafter allowed to set in place. Because the flange is pressed against the interior side wall of the battery jar none of the sealing material can flow downwardly between the two faces so that sealing will rarely occur therebetween.

It is believed that when heat welding thermoplastic materials that at the area of the joint only about 95% of the original tensile strength and a much lower percentage of the original elongation of the thermoplastic material can be regained upon resolidification so that if the joint itself is only as thick as the elements on either side thereof the joint area will be relatively weaker and be more likely to break than the wall areas on either side. With regard to bonding thermoplastic materials reference is made to *Welding of Plastics,* Neumann and Bockhoff, Reinhold Publishing Co., 1959. The manner and method of making battery jars is disclosed in a copending application, U.S. patent application Ser. No. 862,560, filed on Dec. 20, 1977 earlier U.S. Pat. Nos. 3,993,507 and 4,118,265 the subject matter of which is incorporated herein by reference thereto. Joints that are no thicker than the walls on either side are weaker than such side walls and such a structure does not have great impact strength in the horizontal direction. Accordingly, horizontal shear forces that can result if the side wall of the battery jar adjacent the joint were hit or struck in some way there can damage such joints perhaps resulting in a separation between the cover and the battery jar at the point the force is applied.

Further, in many bonding techniques currently in use the cover must be lifted entirely off of the battery jar and away from the terminals so that a heating platen, provided with a central cut out portion capable of fitting over the terminals, can be bought in and lowered into position to heat the joint even. After melting the heater is removed and the cover is finally brought back in place where it is held until the jar area is cooled. The time lag in such procedures is relatively long and some cooling and oxidizing of the plastic can occur, which is undesirable.

SUMMARY OF THE PRESENT INVENTION

The preferred and exemplary embodiment of the present invention not only overcomes the disadvantages mentioned above for the known cover structures but also, together with the welding head structure, hereinafter described, lends itself to being automatically welded in place by heat sealing techniques in a manner that assures correct alignment between the cover and the battery jar. Further, the cover structure helps assure the formation of an extremely consistent and stronger welded area at the joint between the cover and battery jar rim and a welding process that can be quickly and efficiently performed.

The cover includes a primary plate structure which has a constant dimension in the width direction with a varying length. In the battery field it is common to have the width of the battery kept relatively constant and we have found this constant width can be either 6.19 inches or 6.25 inches as commonly used in the industry although the concept set forth herein would apply equally as well as to any battery regard less of its dimensions. The length of the battery to which the present invention is directed varies, preferably, from about 2 inches to about 12 inches, although, here again, additional lengths greater or smaller than those within this range could also apply.

The cover is molded from a thermoplastic material, preferably polypropylene although other thermoplastic materials could be used, according to conventional and injection molding techniques, so that it is formed into a fairly rigid plate structure having the desired dimensions.

The cover is provided with a centrally located opening that will later be used as a vent hole for the battery and enough other terminal post holes, arranged in a predetermined pattern, for enclosing the terminal posts from the electrodes within the battery jar. The top of the cover is normally either flat or provided with a recessed outer rim area and the dimension of the cover should be substantively identical to the outer dimensions of the battery jar to which it will be welded.

The bottom side of the cover is provided with an alignment device or member which is spaced inwardly away from the outer edges of the cover but extends in a relatively uniform or regular manner around the periphery of the cover so that at least predetermined portions thereof will come into contact and engage the interior wall surface of the battery jar to which it will be secured.

In our preferred embodiment the alignment device is comprised of a flange or skirt member which extends continuously about the periphery of the cover, but again is spaced inwardly from the outer edges of the cover a first predetermined distance so that portion of the horizontal bottom surface of the cover extends from that skirt to the outer edge. At least part of this horizontal surface will ultimately become part of the horizontal weld area once the cover is welded onto the battery jar structure.

At spaced intervals along the skirt we provide guide pins which are thicker than the flange so that they extend over both sides of the skirt. While the skirt itself could be made thicker, it is important that the guide pins extend outwardly from the outer vertical surfaces of the skirt, toward the edges of the cover, so that it is the outer surface of the guide pins that contacts the interior surface of the battery jar. Thus, a gap or space is formed between the outer surfaces of the skirt and the inner surface of the battery jar. As will be more fully explained hereinafter, it is that space or gap between the flange or skirt and the inner wall of the battery jar that allows us to obtain consistently uniform welds around the entire seam between the cover and the battery jar and which also allows the melted thermoplastic material to flow therethrough so that any such material which has been degraded during the heating or melting operation can flow out of the joint area so that fresh or clean thermoplastic material will be available from both the cover and jar surfaces to produce a uniform weld. Further, during the heating, as will be also more fully explained hereinafter, a portion of the guide pins will be melted away and the outer surface of the skirt will be softened so that a secondary weld, and in particular, a vertical weld, will be formed between the skirt, the portion of the melted guide bars and a portion of the vertical interior surface of the battery jar adjacent the rim.

In performing the welding operation we have developed a heating and clamping assembly that is broken into four segments with two pairs of opposing segments each being comprised of a heating and clamping bar structure. One pair is longer in length than the longest length battery jar to be sealed while the other pair includes shorter length heating and clamping units that operate interiorly of the two longer units. The two shorter units have a length equal to the standard or constant width of batteries being formed. By forming the heating and clamping bar assembly into these two pairs of opposing members with a smaller pair operating inside the larger it is possible to accomplish the welding process without fully removing the cover from the battery jar. Further, by having each end of the smaller pair of heating elements touch the longer heating elements the outer periphery of both the battery jar rim and the cover will be uniformly contacted by the heating elements and correctly heated. Through use of this assembly only a minimum amount of time is needed to withdraw the heating elements and compress the melted areas together so as to make the best use of the melted thermoplastic material.

Other objects, features, and characteristics of the present invention as well as the methods and operation and functions of the related elements of the structure, and to the combination of parts and economies of manufacuture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

In the drawings:

FIG. 1 is a top plan view of one illustrative embodiment of the cover according to the present invention;

FIG. 2 is a bottom plan view of the cover shown in FIG. 1;

DETAILED DESCRIPTION OF THE PREFERRED EXEMPLARY EMBODIMENT

Figure 3:
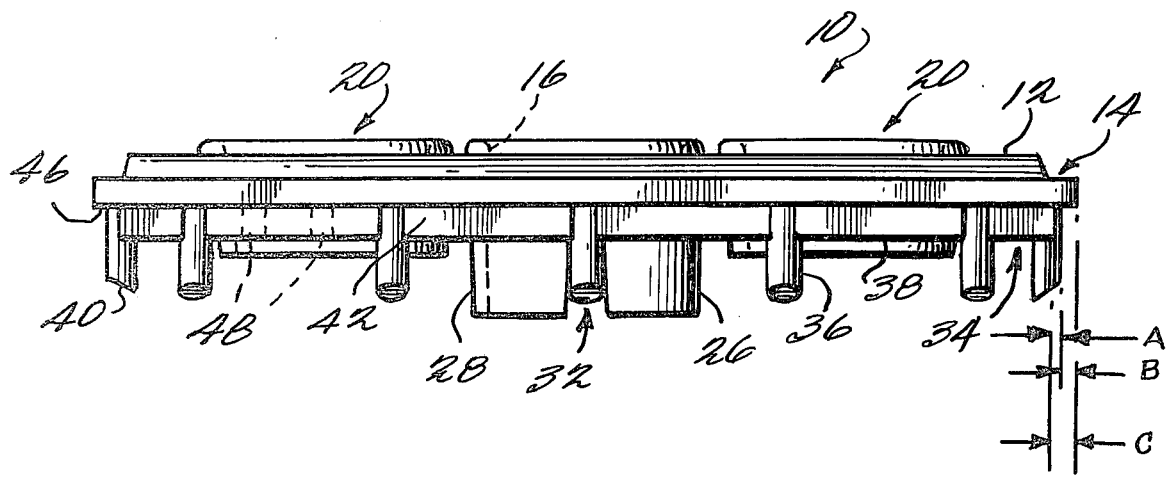
FIG. 3 is a end view of the cover shown in FIG. 1.
Figure 4:
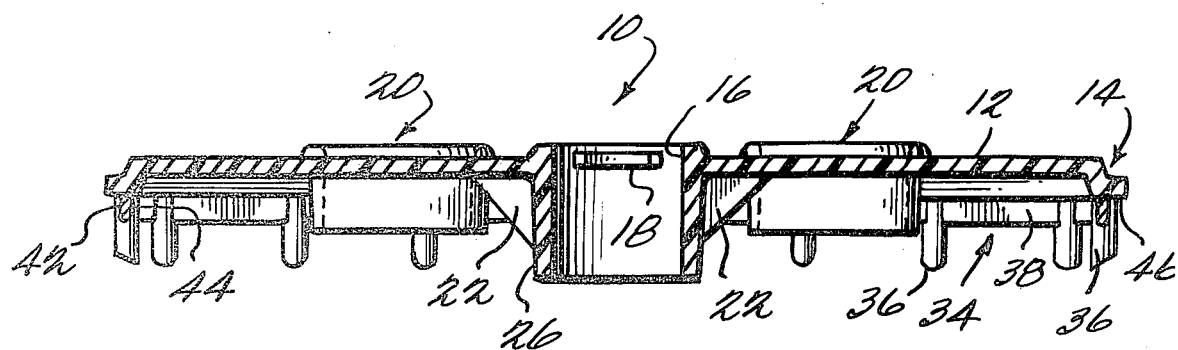
FIG. 4 is a cross-section taken along line 4—4 in FIG. 2.

Turning first to FIG. 1 a cover according to the present invention is generally indicated at 10 and is comprised of a main plate member 12. As shown in FIGS. 3 and 4 plate member 12 is provided with a depending rim portion, generally indicated at 14, although plate member 12 could be a substantially flat plate whose peripheral edge portion was located in the same plane as defined by the top and bottom surfaces of plate member 12.

The cover 10 is provided with a centrally positioned vent hole, indicated at 16, which is provided with projections 18 which will mate with similar projections on a vent cap so that hole 16 can be closed. Hole 16 provides the vent opening for the battery and, as indicated hereinafter, also provides the means by which the cover can be locked into engagement with the welding head or heating and clamping assemblies. Cover 10 is also provided with additional openings indicated in phantom lines at 20, so that terminal posts from the electrodes within the battery jar will be able to extend up through cover 10 wherein place on the battery jar.

The bottom of cover 10 is shown in FIG. 2 where support ribs 22 and 24 respectively support the cover and depending portions 26 and 28 that extend from beneath vent hole 16 and provide stiffening for the vent area. In addition, depending portions 26 and 28 are separated by gaps, generally indicated at 30 and 32, which provide vent passages for gases which may accummulate within the battery during use.

Depending downwardly from the bottom surface of cover 10 and extending about the periphery thereof is an alignment mechanism, generally indicated at 34, which is comprised of a plurality of guide posts, indicated at 36, as well as flange or skirt members 38 which extend between guide posts 38 so that together a continuous member is formed about the periphery of the bottom surface.

Guide posts 36 are preferably spaced about one inch apart although the exact spacing therebetween is not critical, it only being important that they be spaced close enough together so as to straighten the upper edge or rim of the battery jar as they are inserted when cover 10 is placed on the battery jar so that the side walls of the battery jar adjacent the cover will not be rippled but rather will lie substantially flat. This helps to assure that the upper rim of the battery jar will lie directly beneath the outer periphery of cover 10 and adajacent the horizontal weld surface thereof. The length of the front surface of the guide posts 36 is approximately one half inch and their bottoms are tapered as, at 40, at approximately 30 degree although greater amounts of tapering can be employed with the tapered surface, serving as a guide so the cover can be easily inserted into the battery jar.

The skirt or flange 38 has a front or exterior surface 42 which is provided with about a 1 degree taper whereas the rear surface 44 has about a 3 degree taper to facilitate de-molding.

It will be noted from FIGS. 2-4 that guide posts 36 extend outwardly from surface 42 of skirt 38 a predetermined distance which is indicated at A at FIG. 3. Distance A will preferably range from about 0.015 inches to about 0.050 inches with a preferred spacing of about 0.030 to about 0.040 inches. Thus, when the outer portion of guide posts 36 is in contact with the interior side wall 114 of a battery jar, as shown in the various views in FIG. 7, a gap equal to distance A will be formed between surface 42 and surface 114. In addition, the outer edge of cover 10 is spaced from the outer surface of guide posts 36 by a distance B, as shown in FIG. 3, which is equal to the thickness of the jar sidewall, normally about 0.100 inches ($\pm$0.003) with distance C, the distance between the outer edge of cover 10 and surface 42, being a combination of distances A and B.

While guide posts 36 have been shown as cylindrical members it should be understood that square, oblong or cross-sectional shapes could also be used and would perform equally as well since it is only important to obtain the gap between surface 42 and the outer surface of guide post 36. It should also be pointed out that the portion of the bottom surface of cover 10 lying between skirt 38, guide posts 36 and the outer edge of cover 10 defines the horizontal welded surface, indicated at 46, that will mate with and be welded to the upper surface of the battery jar, indicated at 116 in FIG. 7. Further, the upper portion of guide posts 36 and at least certain portions of surface 42 will form a second weld area as these will become, at least in part, welded to portions of the interior surface 114 of the battery jar so that together they will form a second or vertical weld surface area.

As shown in the cross-sectional view of FIG. 4 the skirt thickness is approximately half that of guide posts 36 but it should be understood that the thickness of skirt 38 could be enlarged with any enlargement occurring in an inward direction so that the gap between surface 42 and the outer surface of guide posts 36 would be maintained.

As indicated previously it was found that in the types of battery covers that employed solid continuous flanges that extend around the periphery of the cover that while such a structure exhibited very good shear resistance strength following bonding, welding only occurred between the horizontal surface of the cover and the top surface of the battery jar rim and did not extend vertically along the face of the flange. We believe this is because of the hydraulic flow characteristics and viscosity of the molten plastic which, as such covers where bought back down onto the jar, would be extruded outwardly away from the flange toward the outside of the joint. Thus, the flange itself acted as a dam preventing any inward flow which made the joint only as thick as the side wall and accordingly produced a joint that was weaker in tensile strength than the sidewall.

In the cover described herein, guide posts 36 perform the same function as the solid flange of the above described cover, but without the attendant problems. Guide posts 36, whether used with or without skirt 38, provide means for aligning the battery jar side walls with the molded cover and also serve to maintain that aligned relationship during welding so that the cover and jar remain in engagement throughout welding. Further, by employing the spaced apart guide posts, an area is provided interiorly along the joint allowing that thermoplastic material to be extruded outwardly and inwardly as well.

In order to obtain an even stronger joint, we found that by including skirt portions 38 between guide posts 36 but recessed therefrom a predetermined distance not only was a gap provided which still allowed the thermoplastic material to flow in a vertically downward direction, but a stronger joint was obtained because during heating a portion of guide posts 36 could be melted, surface 42 could be softened and together with the jar's interior wall became a vertically welded area. Thus, a longer joint was produced that exhibited, in total, more tensile strength than the side wall of the battery; the joint structure was more stable than the battery jar itself. However, it should be understood that skirt portions 38 do not have to extend continuously between guide posts 36. Thus, discontinuous skirt portions could be used there between as shown in phantom at 48 in FIG. 3.

Figure 5:
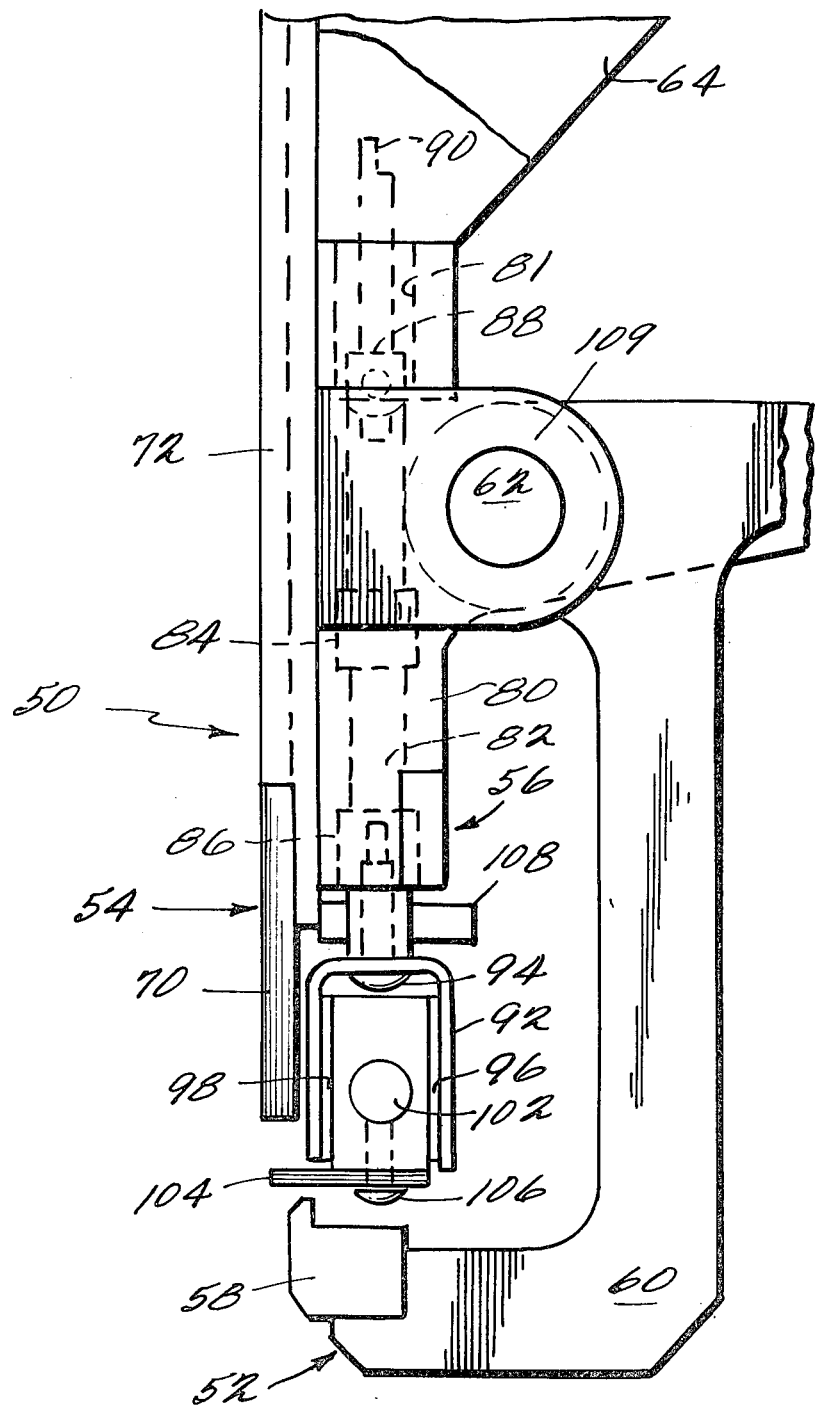
FIG. 5 is a diagrammatic side elevational view of one of the heating and clamp assemblies.
Figure 6:
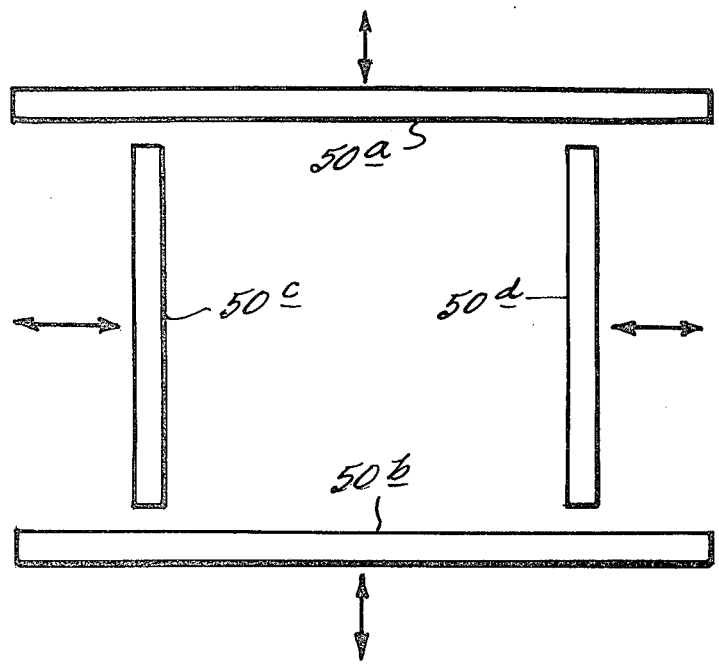
FIG. 6 is a diagrammatic representation of the operating relationship between the four heating and clamp assemblies, such as the one shown in FIG. 5.

Turning now to FIGS. 5 and 6, FIG. 5 shows a sideview of one of the heater and clamp assemblies used to weld cover 10 onto battery jars in a manner or sequence as shown in FIG. 7. The heating and clamp assembly, generally indicated at 50 in FIG. 5, is typical of each of the four heating and clamp assemblies provided on each side of the cover and battery jar unit during the welding cycle. The relationship between the four heating bar and clamp assemblies is shown in FIG. 6 and the four assemblies are shown respectively at 50a–50d. It will be remembered that the relatively constant dimension of battery covers is referred to as their width whereas the length can vary from about 2 inches to about 12½ inches. Heater and clamp assemblies 50a and 50b as shown in FIG. 6 correspond to the clamp bars that will work with the length dimension whereas heater and clamp assemblies 50c and 50d will serve to weld the width dimension of the battery jar and cover unit. It should be understood that it is our intent that the heating elements in assemblies 50a and 50b will touch and be in contact with the heating elements of assemblies 50c and 50d so that the full peripheral surface of both the cover and the battery jar will be contacted with joints being welded from corner to corner.

As indicated in FIG. 6 each of the assemblies 50a–50d is moveable in two directions with the cover and battery jar being position centrally therebetween. The distance between assemblies 50a and 50b will, as can be expected, be defined by the constant length of assemblies 50c and 50d with assemblies 50c and 50d being moved as necessary to accommodate changes in the length of battery jar and cover combinations that are being welded. Thus, with the present welding apparatus, it is possible to weld covers and jars that vary in length over a wide range with the upper limit of the range corresponding to the length of assemblies 50a and 50b.

With reference again to FIG. 5, each of those assemblies will be identical and will be comprised of a jar clamp assembly, generally indicated at 52, a rail assembly, generally indicated at 54 and a heating blade assembly, generally indicated at 56.

Jar clamp assembly 52 is comprised of a clamp pad 58 which can be secured by any convenient means such as by screws or welding to a bell crank 60 which is pivotally connected to a shaft 62 itself connected to the welding and clamping frame structure 64 by means of mounting brackets (not shown). Bell crank 60 can be pivoted into and out of contact with a battery jar by means of a hydraulically controlled linkage system, directly by a hydraulic cylinder or by any other conventional device, it only being important to be able to positively move bell crank 60 into and out of engagement with a battery jar.

The heating and clamping frame structure 64 is arranged to move in a vertical direction and when that structure is moved vertically bell crank 60 and the entire jar clamp assembly indicated at 52 will also move in a vertically direction.

Rail assembly 54 is comprised of a rail member 70 which is connected to an actuating member 72 itself attached to the heating and clamping frame structure 64 and likewise vertically moveable with that frame structure. Accordingly, rail 70 and bell crank 60 move vertically together so that the relative spacing between the bottom of rail 70 and clamp pad 58 will remain constant.

Heating assembly 56 is slideably supported within a guide member 80 by means of a pair of guide rods 82 which are slideably engaged within bore 81 of guide member 80 and in bearings 84 and 86. The top portion of guide rods 82, indicated at 88, is attached to an actuating means, indicated in phantom at 90 which will serve to actuate heating assembly 56 independently of jar clamp assembly 52 and the rail assembly 54.

A heat shield 92 is attached to the bottom of guide rods 82 by a bolt 94 and insulator plates 96 and 98 serve to insulate a conductive block 100 from heat shield 92. A cartridge heater 102 is secured within a cylindrical opening provided in block 100 and serves to heat the heating blade 104 which is held to the conductive block 100 by means of a screw 106. Also, a step 108 is served to a portion of frame 64 to limit the upper movement of heating assembly 56. Guide members 80 are also pivotally secured to shaft 62 by means of mounting brackets 109 and a suitable linkage structure (not shown) so that heating assembly 56 is also pivotally moveable independently of jar clamp assembly 52 and rail assembly 54. As shown in FIG. 5 both the jar clamp assembly 52 and the heater assembly 56 are in their work position and when out of that position both would be pivoted to the right away from the battery cover and jar.

As is shown in FIG. 5, when both the jar clamp assembly 52, the rail 70 and the heater assembly 56 are in their working position as shown, the forward end of heating blade 104 extends beyond the front surface of clamp pad 58. Thus, as shown in FIGS. 7a–h when the front face of pad 58 lies against the exterior surface 112 of the battery jar the forward tip of heating blade 104 will extend inwardly past the interior surface 114 of the battery jar side wall. As indicated previously, blade 104 will preferably extend inwardly beyond the exterior surface of guide posts 36 and be close enough to surface 42 so that that surface becomes softened. Heating blade 104 has a thickness of about 0.085 inches (±0.005) and will be maintained at a temperature ranging from about 230° C. to about 250° C. and preferably at about 240° C.

Turning now to FIGS. 7a–h, the progression of steps that occur during the welding cycle are shown, from which beads have been omitted for the sake of clarity, can be described as follows. It should be pointed out that the welding process is undertaken after the battery jar has had all of the electrical elements installed and the cover 10 has been placed on the battery jar, indicated at 110.

We prefer to have all welding functions. including the transportation of battery jars with covers in place to a working station as well as the functioning of the clamping and welding head clamp assemblies 50, to occur automatically. We prefer to employ a computer control device such as a model 5TI controllor manufactured by Texas Instruments.

Figure 7A:
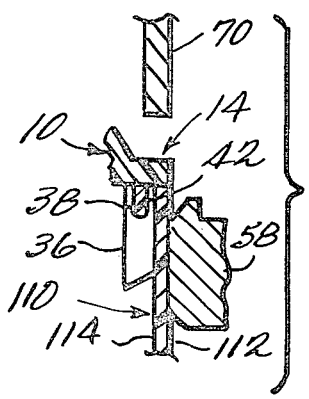
FIG. 7a-7h diagrammatically shows the processing steps performed on the cover and battery jar rim accordingly to the present invention.

Turning first to FIG. 7a the cover 10 has been placed on the battery jar 110 but they are not yet welded together. As can be seen, the outer surface of guide pin 36 touches and engages interior surface 114 and while we have shown only a small section it is to be understood that a similar relationship exists with each of the guide pins around the entire periphery of both the cover 10 and battery jar 110. Thus, at this point in time guide pins 36 depend downwardly into battery jar 110 a substantial distance and together act to conform the shape of the upper rim area of battery jar 110 to the shape of cover 10 so that the side walls of the battery jar 110 become correctly aligned with the cover horizontal weld surface 46.

In order to assure that the opposing side walls of the battery jar are parallel and that adjacent walls are perpendicular, the four sets of heating and clamp bar assemblies, shown in detail in FIG. 5 and whose operation and positioning is diagramatically shown in FIG. 6, are now actuated so that each clamp pad 58 of each of the four assemblies will contact its respective outer wall 112 of battery jars 110. As indicated previously, rails 70 and clamp pads 58 function together in the vertical direction and as is shown in FIG. 7a while clamp pads 58 have been brought into engagement with surfaces 112 they are still in a raised position as evidenced by the gap between rail 70 and the upper surface of rim 14 of cover 10.

Figure 7B:
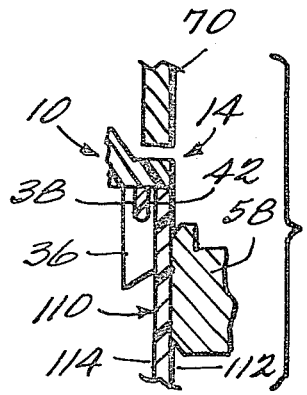

In FIG. 7b, pad 58 and rail 70 are being lowered and this lowering will continue until rails 70 engages the upper surface of rim 14. It should be pointed out that by having cover 10 within jars 110 the cover and jar act as an integral unit. As will become more clear hereinafter the integrity of this combined structure will remain throughout the welding cycle so that the alignment, once obtained, will not be lost. This is important because it is helpful to have the parts that have been melted brought back together as quickly and as accurately as possible and with the present cover structure the alignment between the relative structures is not lost because guide pins 36 are not retracted from jar 110 during the welding procedure. Thus, not only can the cover and jar be bought back into contact quickly but the fact that the pieces have remained aligned throughout the heating cycle allows the accurate positioning of the heated surfaces while still at their optimum welding conditions. Thus, the desired portions of the battery jar will be correctly welded to the desired portions of the cover.

It should also be pointed out that as clamp assemblies 52 are pivoted to bring clamp pads 58 into contact with the sides of battery jar 110 only enough force is applied to the walls of the battery so that the interior surface 110 is bought into contact with the outer surface of the guide pins 36 along the entire length of the side wall. This assures the correct positioning of the side walls with respect to the cover and also forms a uniform gap between surface 42 of skirts 58 and the interior surface 114 of the battery jar.

We have found that by providing this gap a passageway is formed on the interior of the welded area through which molten thermoplastic material, especially that which has been degraded or oxidized as a result of the heating step, can pass. It is known that in welding or bonding thermoplastic materials together the edges to be bonded are heated at least to their fusion temperatures followed by the edges being forced against one another in order to form a welded joint. As a result of this pressure beads are formed on each member and on both sides of the joint. We have found that if the interior surface 114 of the battery jar was positioned directly against a long solid flange with a tight fit the molten plastic material would not flow downwardly along that wall but rather would tend to be extruded from the interior corner between that flange the bottom surface of the cover and the interior area of the side wall of the battery jar outwardly through the horizontal joint toward the exterior of that joint structure. It is important to have clean melted thermoplastic material within joints so that they will be cleanly and securely produced. Should degraded plastic remain within the joint area a good joint may not result. Thus, the gap appearing rearwardly of the front surface of guide pins 36 forms a passageway or a flow passage for the degraded plastic as well as some amount of clean plastic and additionally allows control over the secondary or vertical weld that will formed between surface 42 of the skirt 38 and at least the upper portions of guide pins 36 and the upper portions of the interior surface 114 of the battery jar side walls. This results in both vertical and horizontal welds between the battery jar side walls and cover 10 producing a much stronger joint therebetween. We have found that the gap should preferably range from about 0.015 to about 0.050 inches with a more preferred range of about 0.030 to about 0.040 inches.

Following this initial alignment of the clamp pads 58 with the cover and battery jar structure it is important to establish a fixed relationship between rails 70 and the top 10. This is accomplished by continuing to lower rails 70 as shown in FIG. 7b until they engage rim 14 of cover 10 at which time a clamping device (not shown) can be lowered through vent hole 16. Such a device could be comprised of flexible gripping arms which in their non-actuated condition would pass through vent hole 16 and when actuated would expand to be larger than hole 16 so that an upward vertical force could be placed on the central portion of cover assuring a tight engagement between the cover 10 and rails 70. It should be understood that a suitable pressure sensor could be employed to determine when a predetermined amount of upward vertical pressure had been applied to the so that only a limited amount of force would be applied to produce the desired relationship between cover 10 and rails 70. Thus, following the clamping of central portion of cover 10 rails 70 will tightly engage the perimeter of cover 10.

Figure 7C:
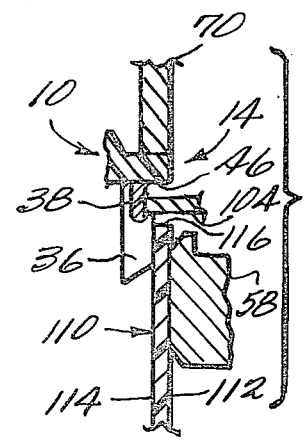

Thereafter, the heating step is undertaken which is shown in FIGS. 7c-7f. It should be kept in mind that the front portion of heating blade 104 is about 0.085 inches thick. Thus, because of the segmented structure for the four heating assemblies 56 and the thickness of the heating blade 104 it is not necessary to completely remove cover 10 from its engagement with battery jar 110. Accordingly, the rail and clamp assemblies 54 and 52 need be raised vertically only something in excess of 0.085 inches on the order of 0.170 inches thereby raising cover 10 with respect to battery jar 110 a like amount to develop a space extending around the periphery between surface 46 and surface 116 respectively. This position is shown in FIG. 7c. Likewise, it is clear from FIG. 7c that guide posts 36 still remain in contact with surface 114 of the battery jar 110. Thereafter, heating blade 104 is pivoted into the position shown in FIG. 7c within the space between the cover and jar so that it lies between surfaces 46 and 116 and can either be close to or contact surface 42 of skirt 38.

Following the rotation or pivoting of heater blade 104 into the position shown in FIG. 7c there are three modes of operation that can be thereafter used depending on the type of thermoplastic material being used, and the thickness of the side walls of the battery jar 110. Thus, heater 104 can be applied longer either to the cover the battery jar rim or held at about an equal period of time on each in order to compensate for these various thickness differences or grade differences of the polpropylene or other thermoplastic material from which the top and battery jar are made. It should be understood that it is desirable to have a hot melt strength of each thermoplastic member on each side of the weld area be at about the same level in order to obtain the optimum strength at the joint and our method of operation allows us to obtain equal hot melt strengths following melting notwithstanding the type of material being used. In FIG. 7 we have shown our preferred method of operating by having heater blade 104 contact the cover for a slightly longer period of time. Since heater assembly 56 is independently moveable in the vertically direction and that stop 108 is provided to limit the distance to which blade 104 can be moved vertically. Likewise, a down stop (not shown) is also provided to exactly limit how far down the heater assembly 56 can move independently of clamp assembly 52 and rail assembly 54.

Figure 7D:
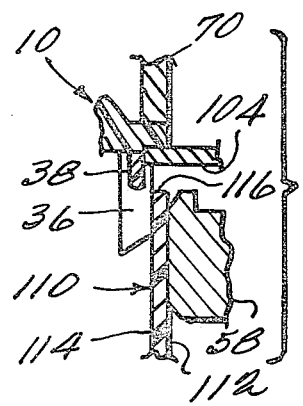

As shown in FIG. 7d, heater blade 104 has been moved upwardly so that it now contacts surface 46 of cover 10 with the up stroke of heater blade 105 being approximately 0.090 inches. As can be seen, a portion of the front of guide pins 36 has been melted away by the front or leading edge of heating blade 104 with that front edge of heating blade 104 being approximately in contact with surface 42 of skirt 38. By raising heating blade 104 in this fashion we assure that a predetermined amount of melting occurs along surface 46 so that following the heating step the cover area will have been melted to the same degree as surface 116 on jar 110.

Figure 7E:
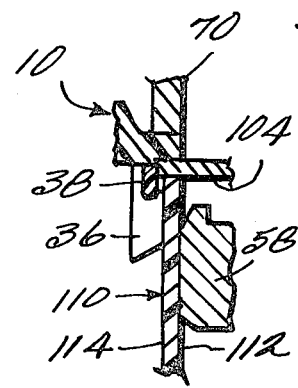

Following this initial raising of heater blade 104 the rail 70 and clamp pad 58 together with heater blade 104 are all moved in a downward stroke as shown in FIG. 7e so that the heater blade 104, now contacts surface 116 of battery jar 110. As indicated previously, the heater blade is kept at an operating temperature ranging from about 230° C. to 250° C. and we have found that a heating time of approximately 10 seconds to about 20 seconds beginning with the entrance of heating blade 104 between surfaces 46 and 116 is sufficient to produce good welds.

Figure 7F:
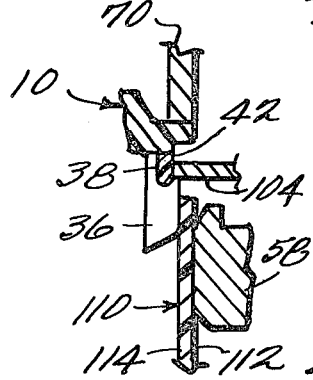

In FIG. 7f, the heating necessary to fully melt surfaces 46 and 116 has been completed and rail 70 and clamp pad 58 are again raised vertically. With the initial raising of those assemblies, the heater blade 104 will be lifted off surface 116 but the heater will momentarily remain in contact with surface 46 since the movement of the parts is a reverse of that shown in FIG. 7d up to this point. Thereafter, the heating assembly 56 can be moved downwardly so that it becomes separated from surface 46 and this downward motion of heating assembly 56 can occur simultaneously with the continued raising of rail 70 and clamp pad 58 or it can occur subsequently, again depending upon the materials being welded together. In any event, the heating blade 104 becomes vertically separated from both surfaces 46 and 16 prior to its rotation out of its work position back to its original start position away from the combined structure.

If it is desirable to heat surfaces 46 and 116 approximately for equal periods, the heater assembly 56 can be allowed to float following its positioning as shown in FIG. 7c rather than being raised to contact surface 46 ahead of the lowering of the entire heating and clamp assembly 50 from the position shown in FIG. 7d to that shown in FIG. 7e. Thus, heater assembly 56 would be pivoted into position and hydraulic or the driving force thereon would be removed. It should be pointed out, that when heater blade 104 is initially bought into position, it will be at its lowest position relative to cover 10 which is securely held against rail 70. Thus, as shown in FIG. 7d when heating blade 104 is raised vertically to come into contact with surface 46 a portion of the front of guide pins 36 will be melted away as shown in FIG. 7d and that condition exists throughout the processing as shown in FIGS. 7e-h. By melting that portion of guide pins 36 those portions are assured to become part of the vertical weld area in the final structure. Also by having the front edge of heating blade 104 close to or in contact with surface 42 of skirts 38 that surface is at least softened so that it will also form part of the vertical weld in the final structure. With the heating blade 104 in its lowest position and with the drive pressure removed the heating bar and clamp assemblies 50 can be lowered to the position as shown in FIG. 7e.

In the third mode of operation, if it was desired to have the heating blade 104 contact surface 116 on battery jar 110 for a longer period of time the heating blade would again be pivoted into position as shown in FIG. 7c. Since the heating blade 104 is at its lowest position relative to cover 10 when at that point if the driving force is allowed to remain on but not actuated to raise the heating blade 104 in a vertically upward direction as in the preferred mode of operation, the heater blade 104 can be held at its lowest position so that it will contact surface 116 first as the four heating bar and clamp assemblies 50 are lowered with the continued lowering causing surface 46 to come into contact with heater blade 104. In each of these latter two modes the withdrawal sequence of heater blade 104 is the same as that described above as it is most desirable to withdraw thermoplastic surfaces vertically or perpendicularly away from the heating device rather than having the heating device slide from between the two thermoplastic members.

Figure 8:
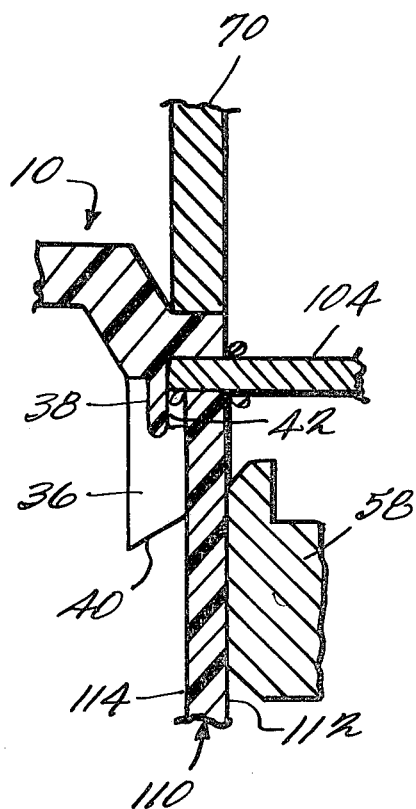
FIG. 8 is an enlarged diagrammatically view similar to FIG. 7e showing the bead formation during heating.
Figure 7G:
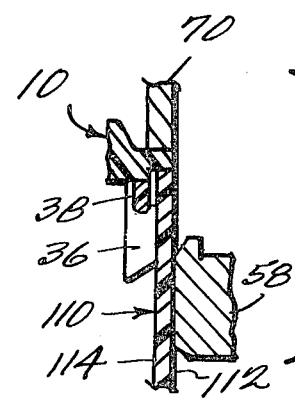

Following the pivoting of heating blade 104 away from the joint structure to its original starting position within the heating and clamp assembly structure 50, the heating bar clamp assembly 50 can be again lowered so that top 10 is again bought back into its fully closed position with respect to jar 110 with continued pressure causing the melted surfaces therebetween to be bought together into a full welding engagement. Further downward pressure can be directly applied to the joint by means of rails 70 and this downward pressure extrudes melted thermoplastic material away from both sides of the joint and the degraded material caused by the melted surfaces contacted with heater blade 104 can flow both inwardly towards surface 42 and down long that surface as well as outwardly from the joint. It should be pointed out, with reference to FIG. 8, that during the heating step beads of thermoplastic material are formed both exteriorly and interiorly as shown. Thus, during the pressure step as shown in FIG. 7g these beads continue to be formed or enlarged, with the gap between skirt 38 and the interior surface 114 of battery jar 110 providing a flow path along which these beads can pass so that the degraded material can be completely removed from between the weld surfaces. In addition, the heating not only creates the primary horizontal weld surface between surfaces 46 and 116 of the cover battery jar, respectively, but the flowing of thermoplastic material past surface 42 and in contact with the melted portion of guide bars 36 forms a second and vertical weld between skirt 38 guide members 36 and the interior surface 114 of battery jar 110. This homogenous weld area is shown in phantom in FIG. 9 and will provide an extremely strong joint between cover 10 and battery jar 110.

Figure 9:
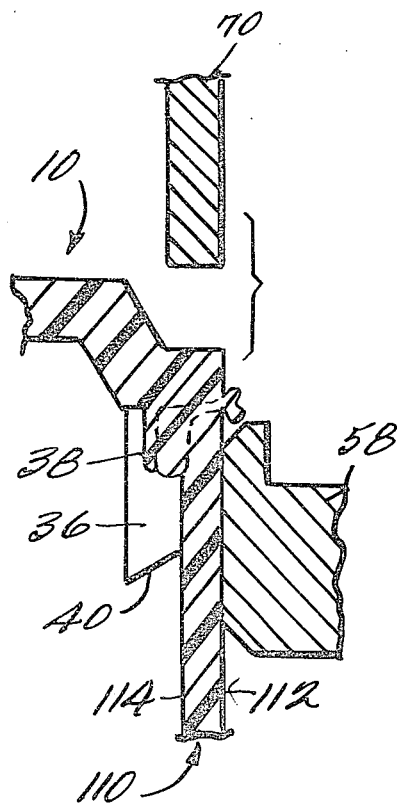
FIG. 9 is an enlarged diagrammatic view showing the resulting homogeneous weld structure following the welding process.
Figure 7H:
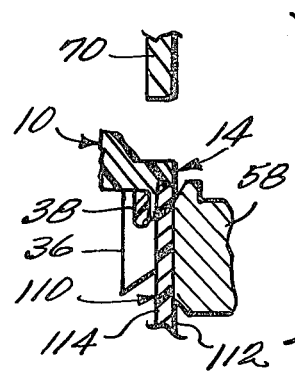

The relative position of rail 70 and clamp pad 58 as shown in FIG. 7h can be held for a cool down period of about 15 to about 25 seconds in order to allow the weld area, shown in FIG. 9, to set or, in order to allow the thermoplastic material to resolidify so that the joint has regained strength. Following this cool down period, the heating and clamp assemblies 50 will be retracted to their original position and the finished battery jar with its cover welded in place can be moved out of the welding or work area.

As an optional step, the clamp pads 58 could be raised vertically prior to retraction thereby spreading the still soft beads which formed exteriorly of the joint upwardly along the side wall. It will be noted from observing the series of FIGS. 7a–h, at no time during the welding sequence have guide pins 36 been removed from battery jar 110. Whenever cover 10 was raised or lowered with respect to battery jar 110, the initial alignment established therebetween was never lost and cover 10 can be raised and lowered without affecting the desired registry between surfaces 46 and 116 which is fully maintained thereby assuring a proper final welded relationship therebetween.

Pursuant to the above precedures we have found that we can obtain stronger joints that have an area relatively larger than the thickness of the side wall so that the joint is not weaker than the tensile strength of that side wall. We have obtained a joint that is more reliably welded and because of the guidance and alignment capability provided by guide pins 36 during and prior to the point of contact of surfaces 46 and 116 following heating we can achieve better control over the welding process. Further, because of the gap existing between surface 42 and the interior surface 114 we can use what would otherwise be wasted extruded material in order to form a second vertical weld between those surfaces. The presence of guide pins 36 also allows the ability to work with distorted battery jars which will become more a problem as the sidewall thicknesses of battery jars is decreased.

While the invention has been described in connection with what is presently conceived to be the most practical and preferred embodiment, it is to be understood that the invention is not to be limited to the disclosed embodiment but on the contary, is intended to cover various modifications and equivalent arrangements included within the spirit and scope of the appended claims, which scope is to be accorded the broadest interpretation of such claims so as to encompass all such equivalent structures and methods.

What we claim is:

1. A cover for a thermoplastic battery jar comprised of a thermoplastic plate member having a predetermined thickness, top and bottom surfaces and four edges, a plurality of means defining openings extending through said plate member, and guide means for engaging and aligning the interior of a battery jar therewith and for defining weldable surfaces on said cover, said guide means positioned at least at predetermined spaced apart locations around said plate member and extending downwardly away from said bottom surface a first predetermined distance and spaced inwardly a second predetermined distance from said edges, said guide means having an outer surface in contact with (at least a portion of which contacts) the interior of said jar serving to define a plurality of gaps at predetermined positions around said jar and interiorly thereof when said cover is placed on the jar.

2. A cover as in claim 1 wherein one of said openings comprises a vent hole.

3. A cover as in claim 1 wherein said guide means defines horizontal and vertical weld surfaces on said cover.

4. A cover as in claim 1 wherein said weld surfaces include at least horizontal weld surfaces extending horizontally along said bottom surface from said guide means outwardly to each of said edges.

5. A cover as in claim 4 wherein said weld surfaces further include vertical weld surfaces extending downwardly along at least a portion of said guide means.

6. A cover as in claim 1 wherein said guide means comprises at least a plurality of guide posts spaced about said cover in a predetermined manner.

7. A cover as in claim 6 wherein said guide posts are spaced apart substantially regularly.

8. A cover as in claim 6 wherein said guide means further includes discontinuous skirt portions depending from said bottom surface and positioned at predetermined locations between said guide posts.

9. A cover as in claim 8 wherein said discontinuous skirt portions are offset inwardly from the portion of said guide posts in contact with the battery jar so that a passage is provided between said discontinuous skirt portions and the battery jar.

10. A cover as in claim 6 wherein said guide means further includes skirt portions depending from said bottom surface and extending between said guide posts.

11. A cover as in claim 10 wherein said skirt portions are offset inwardly from the portion of said guide posts in contact with the battery jar so that a passage is provided between said skirt portions and the battery jar.

12. A cover as in claim 1 wherein said guide means includes a plurality of spaced apart members extending along each of said edges.

13. A battery jar cover comprised of
a primary member having top and bottom surfaces, said member having means defining a plurality of holes therethrough,
guide means depending from said bottom surface for guiding said cover into said battery jar,
said guide means extending about said cover in a predetermined manner and spaced a predetermined distance inwardly from the periphery thereof so that a portion of said guide means forms a vertical weldable surface area,
at least a first horizontal weld surface area formed on said bottom surface between said guide means and the periphery of said cover,
said guide means being arranged so that predetermined spaced apart portions thereof are in contact with the interior surface of the battery jar with the remaining portions thereof spaced inwardly of the battery jar when said cover is placed thereon defining a gap between the inner surface of said jar and the remaining predetermined portions.

14. A cover for a battery jar comprising a plate member having top and bottom surfaces and four edges, means defining a plurality of openings extending therethrough and means depending from said bottom surface and spaced inwardly from each of said edges, said depending means serving to contact the interior of the battery jar at predetermined spaced apart locations so as to align the battery jar with said cover and for forming a plurality of spaced apart passages between said spaced apart points of contact and the interior of the battery jar so that the interior surface of the battery jar is exposed when said cover is placed in position on the battery jar.

15. A battery jar cover comprised of:
a plate member having top and bottom surfaces and including means defining at least one opening extending therethrough,
a guide structure secured to the bottom surface and having first and second portions,
the first portion extending downwardly from said bottom surface a first predetermined distance and being spaced a second predetermined distance inwardly from the periphery of said cover and extending continuously thereabout,
said second portion comprising a plurality of members extending downwardly from said bottom surface a third predetermined distance,
each of said plurality of members being spaced apart along said first portion and having at least a portion thereof extending outwardly beyond said first portion toward the periphery of said cover so that when said cover is placed on said jar, the outer surface of said plurality of members contacts the interior surface of said jar and a gap is defined between the interior surface of said jar and the said first portion with the portion of said bottom surface defined between said first portion and the periphery of said cover comprising a horizontal welding surface and at least that part of said second portion extending outwardly from said first portion comprising a vertical welding surface.

16. A cover as in claim 15 wherein the portion of said bottom surface defined between said first portion and periphery of said cover comprises a horizontal welding surface.

17. A cover as in claim 15 wherein said first portion comprises discontinuous skirt members.

18. A cover as in claim 17 wherein at least a portion of said discontinuous skirt members adjacent said bottom surface forms a vertical weld surface area.

19. A cover as in claim 15 wherein said second portion comprised guide posts.

20. A cover as in claim 19 wherein at least a portion of said guide posts adjacent said bottom surface forms a vertical weld surface area.

21. A cover as in claim 15 wherein said plurality of members comprise guide posts and said first portion comprises skirt members extending between each of said guide posts.

22. A cover as in claim 21 wherein at least a portion of said guide posts and said skirt members adjacent said bottom surface forms a vertical weld surface area.

23. A cover for a battery jar comprised of a plate member having top and bottom surfaces and four edges, means defining a plurality of openings extending through said plate member, and guide means for discontinuously engaging and aligning the interior of said battery jar therewith and for defining weldable surface areas on said cover, said guide means extending discontinuously around said plate member and downwardly away from said bottom surface a first predetermined distance and spaced inwardly from said edges a second predetermined distance, said guide means being in contact with the interior of said jar discontinuously when said cover is placed on the jar so that open areas where said guide means is not in contact with the jar are defined in a discontinuous manner about and directly against the interior of said jar.

24. A cover capable of being welded onto a battery jar comprised of a plate member having top and bottom surfaces and four edges, means defining a plurality of openings extending through said plate member, and guide means for aligning the cover with the battery jar and for defining a plurality of spaced apart open areas interiorly of the area where the cover and jar are welded together exposing the interior surface of the battery jar adjacent the weld area when the cover is positioned on the battery jar.

25. A cover for a battery jar comprising a plate member having top and bottom surfaces and four edges, means defining a plurality of openings extending therethrough and guide means depending from said bottom surface and spaced inwardly from each of said edges for aligning the battery jar with said cover, said guide means having a plurality of discontinuous guide members in contact with the interior surface of the battery jar with a plurality of open passages formed therebetween exposing the interior surface of the battery jar when said cover is in position on the battery jar.

* * * * *